(12) United States Patent
Oh et al.

(10) Patent No.: US 7,809,072 B2
(45) Date of Patent: Oct. 5, 2010

(54) TRANSMITTER AND RECEIVER FOR USE IN A RELAY NETWORK, AND SYSTEM AND METHOD FOR PERFORMING TRANSMISSION AND RECEPTION USING THE SAME

(75) Inventors: Hyun-Seok Oh, Incheon (KR); Yong-Serk Kim, Seoul (KR); Jae-Hawk Lee, Seoul (KR); Min-Goo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1245 days.

(21) Appl. No.: 11/287,186

(22) Filed: Nov. 28, 2005

(65) Prior Publication Data
US 2006/0115015 A1 Jun. 1, 2006

(30) Foreign Application Priority Data
Nov. 26, 2004 (KR) .................. 10-2004-0097851

(51) Int. Cl.
*H04B 7/02* (2006.01)
*H04L 1/02* (2006.01)
(52) U.S. Cl. .................. 375/267; 375/299; 375/347; 370/334; 455/101
(58) Field of Classification Search .................. 375/267, 375/299, 347; 370/334; 455/101
See application file for complete search history.

(56) References Cited

U.S. PATENT DOCUMENTS

| 7,065,144 | B2* | 6/2006 | Walton et al. | 375/260 |
| 7,184,713 | B2* | 2/2007 | Kadous et al. | 455/67.13 |
| 2004/0266339 | A1* | 12/2004 | Larsson | 455/7 |

* cited by examiner

*Primary Examiner*—Ted M Wang
(74) *Attorney, Agent, or Firm*—Roylance, Abrams, Berdo & Goodman, L.L.P.

(57) ABSTRACT

An apparatus and method are provided for transmitting high-speed data through a plurality of transmitter antennas using a relay network, receiving signals transmitted from the plurality of transmitter antennas, and removing interference in a mobile communication system. The received signals are despread on a transmitter antenna-by-transmitter antenna basis according to a preset spreading factor. The despread signals are divided into data signals and noise. The signals transmitted through the plurality of transmitter antennas are regenerated from recovered data signals. Data components and interference signal components are identified. The interference signal components are removed from the signals transmitted on the transmitter antenna-by-transmitter antenna basis.

5 Claims, 7 Drawing Sheets

Recursion:
$$r^{(m+1)}[k] = r^{(m)}[k] - \sqrt{\frac{\alpha^2}{M}} h_1^{(m)} \sum_{j=1}^{J} c_j[k] \hat{b}_{mj}^{(m)}$$
$$m = m+1$$
$$z_j^{(m)} = \sum_{k=1}^{N_{SF}} c_j^*[k] r^{(m)}[k]$$
$$H^{(m)} = [h_1^{(m)} h_2^{(m)} \cdots h_{M-m+1}^{(m)}] = [b_{m+1} b_{m+2} \cdots b_M]$$
$$W^{(m)} = [w_1^{(m)} w_2^{(m)} \cdots w_M^{(m)}] = \sqrt{\frac{M}{\alpha^2}} H^{(m)} \left( H^{(m)*} H^{(m)} + \frac{M}{\alpha^2} I_M \right)^{-1}$$
$$\tilde{b}_{mj}^{(m)} = w_1^{(m)*} z_j^{(m)}, j = 1, 2, \cdots, J$$
$$\hat{b}_{mj}^{(m)} = \text{hard decision of } \{\tilde{b}_{1j}^{(m)}\}$$

TRANSMITTER AND RECEIVER FOR USE IN A RELAY NETWORK, AND SYSTEM AND METHOD FOR PERFORMING TRANSMISSION AND RECEPTION USING THE SAME

PRIORITY

This application claims priority under 35 U.S.C. §119(a) to Korean Patent Application entitled "Transmitter and Receiver for Use in a Relay Network, and System and Method for Performing Transmission and Reception Using the Same" filed in the Korean Intellectual Property Office on Nov. 26, 2004 and assigned Serial No. 2004-97851, the entire disclosure of which is hereby incorporated by reference.

BACKGROUND OF THE INVENTION

1. Field of the Invention

The present invention relates to an apparatus and method for removing interference signal components between multiple transmitter antennas. More particularly, the present invention relates to an apparatus and method for removing interference signal components between multiple transmitter antennas when a mobile communication system with a plurality of transmitter and receiver antennas supports high-speed packet data.

2. Description of the Related Art

Current mobile communication systems are developing into wireless broadband communication systems of more than 5 GHz. For example, a wireless local area network (LAN) operates at 24 GHz of an industrial, scientific & medical (ISM) band corresponding to a frequency band capable of being used without a special license. In this case, the spectral efficiency of the system requires more than 10 bits/s/Hz per channel.

A multiple-input multiple-output (MIMO) system with a plurality of transmitter and receiver antennas is being considered as a mobile communication system capable of satisfying the spectral efficiency according to high-speed and high-capacity services.

FIG. 1 illustrates a structure of a conventional MIMO system.

When the number of antennas of a transmitter is M and the number of antennas of a receiver is N as illustrated in FIG. 1, the transmitter can simultaneously transmit independent data elements using the M antennas if a Vertical Bell Labs Layered Space-Time (V-BLAST) scheme is used. According to the V-BLAST scheme, the transmitter transmits parallel data and the receiver detects the transmitted data by repeatedly using a minimum mean-square error (MMSE) scheme. When the V-BLAST scheme is applied, an amount of data to be transmitted can be increased by the number of transmitter antennas.

When the MIMO system is used for the transmitter/receiver, additional degrees of freedom of the spatial dimension are introduced into the mobile communication system. In relation to the degrees of freedom, the MIMO system provides two space-time processing methods.

In a first method, space-time coding improves the reliability of a channel link. For example, the space-time coding system combats fading effect using diversity in a communication channel.

In a second method, spatial multiplexing improves the spectral efficiency. For example, the spatial multiplexing system can simultaneously transmit and receive high-speed data without additionally allocating bandwidth or power.

The conventional MIMO system has a technical limitation in that the number of transmitter antennas of a base station (BS) must be less than the number of receiver antennas of a mobile station (MS). However, there is a drawback in that the conventional MIMO system is not suitable for high-speed data communication due to the technical limitation associated with the number of transmitter antennas. As a result, the conventional MIMO system may degrade the spectral efficiency and system performance.

In the MIMO system, antennas need to be distinguished in a spatial domain. Accordingly, independent channel characteristics without any correlation are required. However, it is difficult for the MS to ensure the independent channel characteristics between the antennas when the number of receiver antennas is less than the number of transmitter antennas. When the number of receiver antennas is less than the number of transmitter antennas, the performance of the MS is significantly degraded.

For example, when the MIMO system of FIG. 1 uses the spatial multiplexing according to the second method, transmitter antennas 102, 104, and 106 simultaneously transmit different symbols $S_1, S_2, \ldots, S_M$. Accordingly, the transmitter antenna 102 transmits the symbol $S_1$, the transmitter antenna 104 transmits the symbol $S_2$, and the transmitter antenna 106 transmits the symbol $S_M$.

When the number of transmitter antennas is the same as the number of receiver antennas as illustrated in FIG. 1, a multipath channel linearly operates in the MIMO system. When a frequency band is high, a propagation channel gradually becomes a line-of-sight channel and a correlation level increases. Accordingly, a problem occurs in actually implementing the MIMO system technology depending upon sufficient channel dispersion effect if the frequency exceeds 5 GHz. For example, a matrix coefficient of a MIMO channel is set to "1" in a non-multipath channel situation, and the channel cannot be applied to the spatial multiplexing.

A problem occurs in that a receiver using the MMSE system cannot operate when the matrix coefficient of a channel is small, and the receiver performance is severely degraded. As a result, significant performance degradation occurs due to interference between the antennas that cannot be negligible.

Accordingly, there is a need for an improved apparatus and method for removing interference signal components between transmitter antennas in order to improve signal detection performance from a receiver.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a transmitter that includes multiple transmitter antennas for transmitting signals using a relay transmission scheme, a receiver for removing interference signal components between the transmitter antennas from the signals transmitted by the transmitter and recovering data, and a system and method for performing transmission and reception using the transmitter and receiver.

In accordance with an aspect of exemplary embodiments of the present invention, there is provided a receiver for recovering high-speed data transmitted from a plurality of transmitter antennas through a relay node, comprising a plurality of equalizers for dividing signals transmitted from the plurality of transmitter antennas into data signals and noise. A decoder and deinterleaver decodes and deinterleaves the signals outputted from the plurality of equalizers and recovering data. A regenerator regenerates the transmitted signals from the recovered data and identifies the data signals and interference signal components. A plurality of adders remove the interference signal components from the signals transmitted on a transmitter antenna-by-transmitter antenna basis.

In accordance with another aspect of exemplary embodiments of the present invention, there is provided a transmitter for transmitting high-speed data through a plurality of transmitter antennas in a mobile communication system, comprising a relay network controller for performing a control operation such that the high-speed data is transmitted in one of a direction transmission scheme or a relay transmission scheme using feedback information transmitted from a receiver and a relay node. A demultiplexer demultiplexes a stream of the high-speed data to be transmitted according to a data transmission rate set by the feedback information. A data converter is included for encoding, interleaving, and spreading the demultiplexed data stream. A beamformer forms beams based on preset weight values for spread signals, according to a control operation of the relay network controller and transmits the beams through the plurality of transmitter antennas.

In accordance with still another aspect of exemplary embodiments of the present invention, there is provided a method for receiving and recovering high-speed data transmitted through a plurality of transmitter antennas in a mobile communication system, the method comprising despreading received signals on a transmitter antenna-by-transmitter antenna basis according to a preset spreading factor and dividing the despread signals into data signals and noise. The signals transmitted through the plurality of transmitter antennas are regenerated from the data signals and data components and interference signal components are identified. The interference signal components are removed from the signals transmitted on the transmitter antenna-by-transmitter antenna basis.

In accordance with yet another aspect of exemplary embodiments of the present invention, there is provided a method for transmitting high-speed data through a plurality of transmitter antennas in a mobile communication system, the method comprising setting a transmission rate of the high-speed data to be transmitted using feedback information from a target receiver to which the high-speed data is transmitted. A stream of the high-speed data is demultiplexed in order to be transmitted according to the data transmission rate set by the feedback information. The method also includes encoding, interleaving, and spreading the demultiplexed data stream and forming beams based on weight values for spread signals according to a control operation of a relay network controller. One of a direct transmission scheme or a relay transmission scheme is selected on a basis of the feedback information, and the high-speed data in the selected transmission scheme is transmitted.

Other objects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

Figure 1:
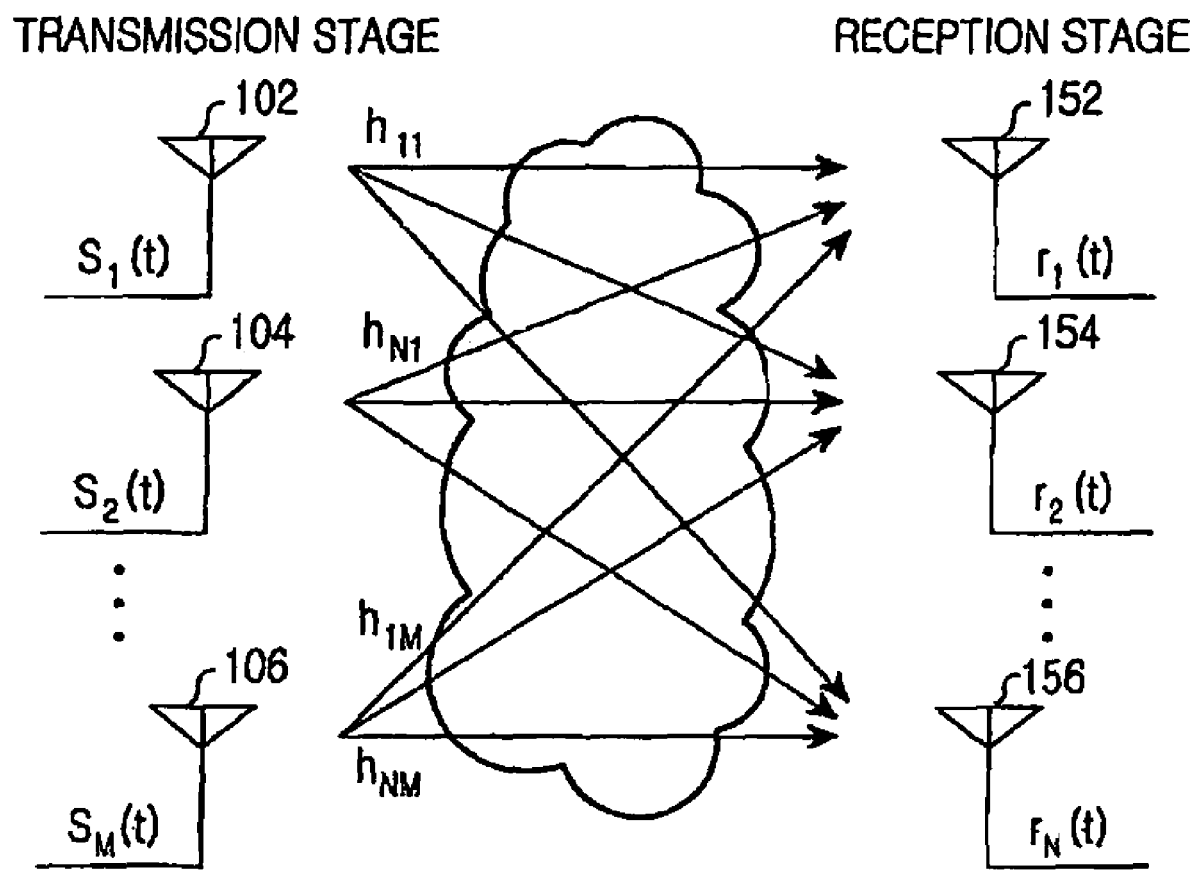
FIG. 1 illustrates a structure of a conventional mobile communication system using multiple transmitter/receiver antennas.

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As a mobile communication system is developed to a communication system for supporting a high-speed data service, a multiple-input multiple-output (MIMO) system using a plurality of transmitter and receiver antennas is provided in the communication system.

In the conventional mobile communication system, the number of antennas of a transmitter (or base station (BS)) is more than the number of antennas of a receiver (or mobile station (MS)). Accordingly, technical limitations of the MIMO system result in a degradation of system performance in terms of high-speed data communication and spectral efficiency.

To address this problem occurring in the MIMO system, the exemplary embodiments of present invention provide a mobile communication system in which a relay transmission scheme is applied. For example, the relay transmission scheme can prevent in advance sudden degradation of the system performance because the relay transmission scheme transmits data on the basis of the number of antennas in the receiver. The present invention provides a method for suitably removing antenna interference noise of the MIMO system to ensure system performance in a receiver even when the relay transmission scheme is applied, such that high-speed data communication can be more effectively supported and system performance can be improved.

On the other hand, antennas need to be distinguished in a spatial domain in the MIMO system. Accordingly, independent channel characteristics without any correlation are required. However, it is difficult to ensure independent channel characteristics between the antennas in a small-sized MS in terms of a hardware structure. When the number of receiver antennas is less than the number of transmitter antennas, the performance of the MS is significantly degraded.

The relay transmission scheme can prevent the degradation of system performance and can reduce a path loss and transmission power. Interference between the antennas is still present even when the relay transmission scheme is applied and severe performance degradation due to the interference may occur in the receiver. Accordingly, exemplary embodiments of the present invention detects antenna signals in descending order of signal strength, regenerates signals of the transmitter antennas using the detected signals, and removes the regenerated signals from all the received signals, thereby preventing interference between antennas. If the interference between the antennas is removed, the signal detection performance of the receiver is significantly improved.

Figure 2:
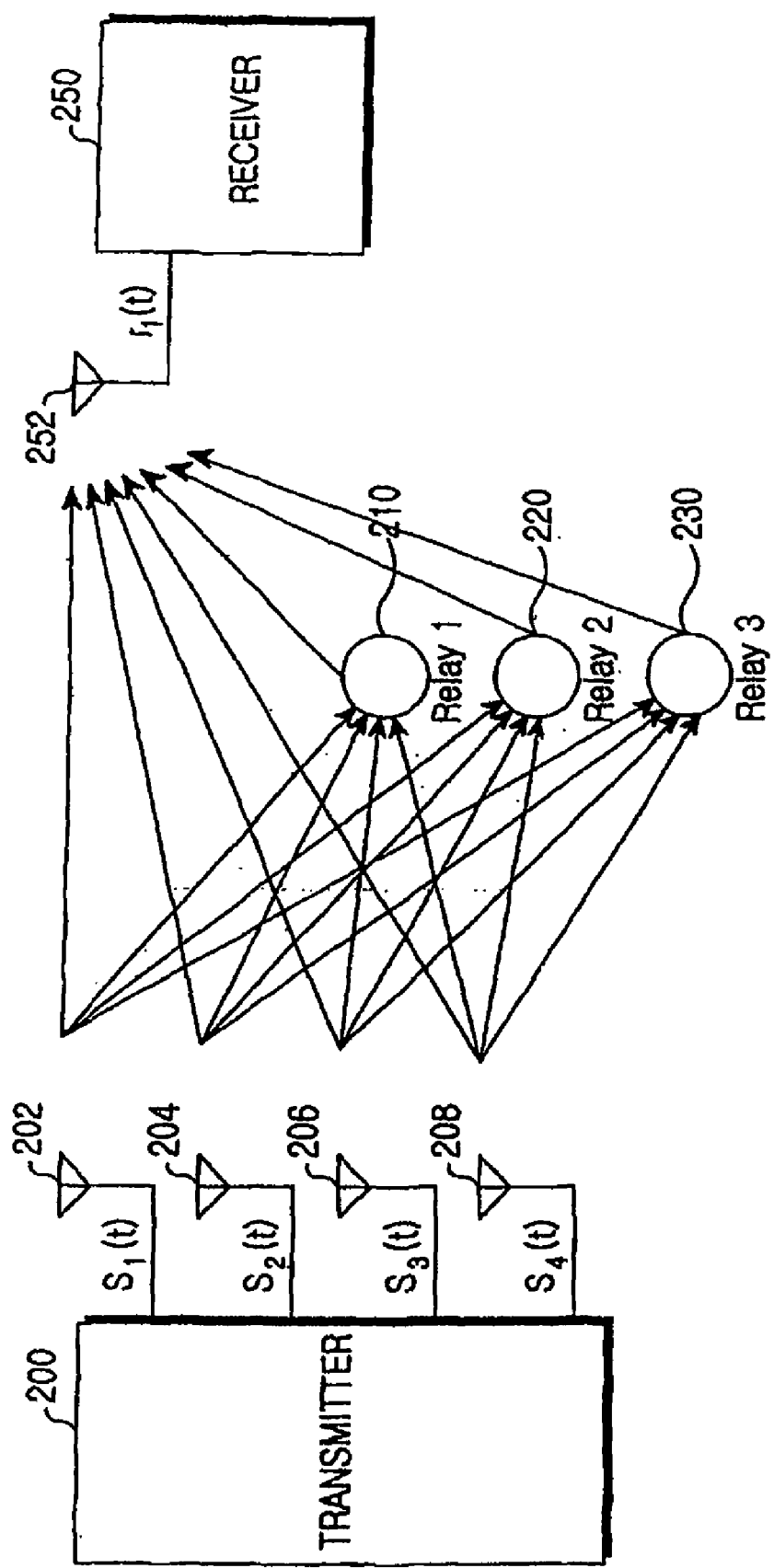
FIG. 2 is a block diagram illustrating a transmission/reception structure based on a relay network scheme in accordance with an exemplary embodiment of the present invention.

FIG. 2 is a block diagram illustrating a transmission/reception structure based on a relay network scheme in accordance with an exemplary embodiment of the present invention.

The exemplary embodiments of the present invention preferably assume that multiple users simultaneously share identical radio resources in a mobile communication system. In this mobile communication system, a frequency domain is distinguished between forward and reverse links.

As illustrated in FIG. 2, a relay network in accordance with an exemplary embodiment of the present invention includes a BS 200, relay stations 210, 220, and 230, a target station 250, and a direct station that is located around the BS 200 and the target station 250 that operates as a node.

The target station 250 is an MS for mainly communicating with the BS 200. A plurality of MSs located in a cell covered by the BS 200 can possibly operate as the direct station for the target station 250. For example, the target station 250 not only can independently communicate with the BS 200, but also can communicate with the BS 200 through the relay stations 210, 220, and 230 and the direct station. In this instance, a relay network controller preferably limits the maximum number of nodes that can be simultaneously linked to the target station 250.

A direct transmission scheme is a transmission scheme based on a single hop for directly connecting the BS 200 to the MS 250 without passing through any node. However, the relay transmission scheme is a transmission scheme for linking a node using multiple hops. For example, the node needs to be configured in the relay transmission scheme such that a path loss is minimized on radio and a dead spot can be avoided.

FIG. 2 illustrates the relay transmission scheme using Relay Station-1 210, Relay Station-2 220, and Relay Station-3 230 when the number of transmitter antennas of the BS 200 is "4" and the number of receiver antennas of the MS is "1".

Referring to FIG. 2, the BS 200 transmits a symbol $S_1$ to Relay Station-1 210 through the transmitter antenna 202, transmits a symbol $S_2$ to Relay Station-1 210 through the transmitter antenna 204, transmits a symbol $S_3$ to Relay Station-1 210 through the transmitter antenna 206, and transmits a symbol $S_4$ to Relay Station-1 210 through the transmitter antenna 208. These operations of the BS 200 are repeated for Relay Station-2 220 and Relay Station-3 230. The relay stations 210, 220, and 230 receive data from the BS 200 and retransmit the received data to the next node or the target station 250.

The target station 250 is provided with a single receiver antenna 252, but can obtain a similar effect by virtually using four receiver antennas. That is, it can be found that a channel matrix coefficient is increased from "1" to "4". An increased matrix coefficient indicates an increased data rate, such that a high-speed service is possible.

When the relay network is configured, the BS 200 preferably identifies the number of transmitter antennas and the number of receiver antennas and increases a channel matrix coefficient or efficiently uses radio resources.

Figure 3:
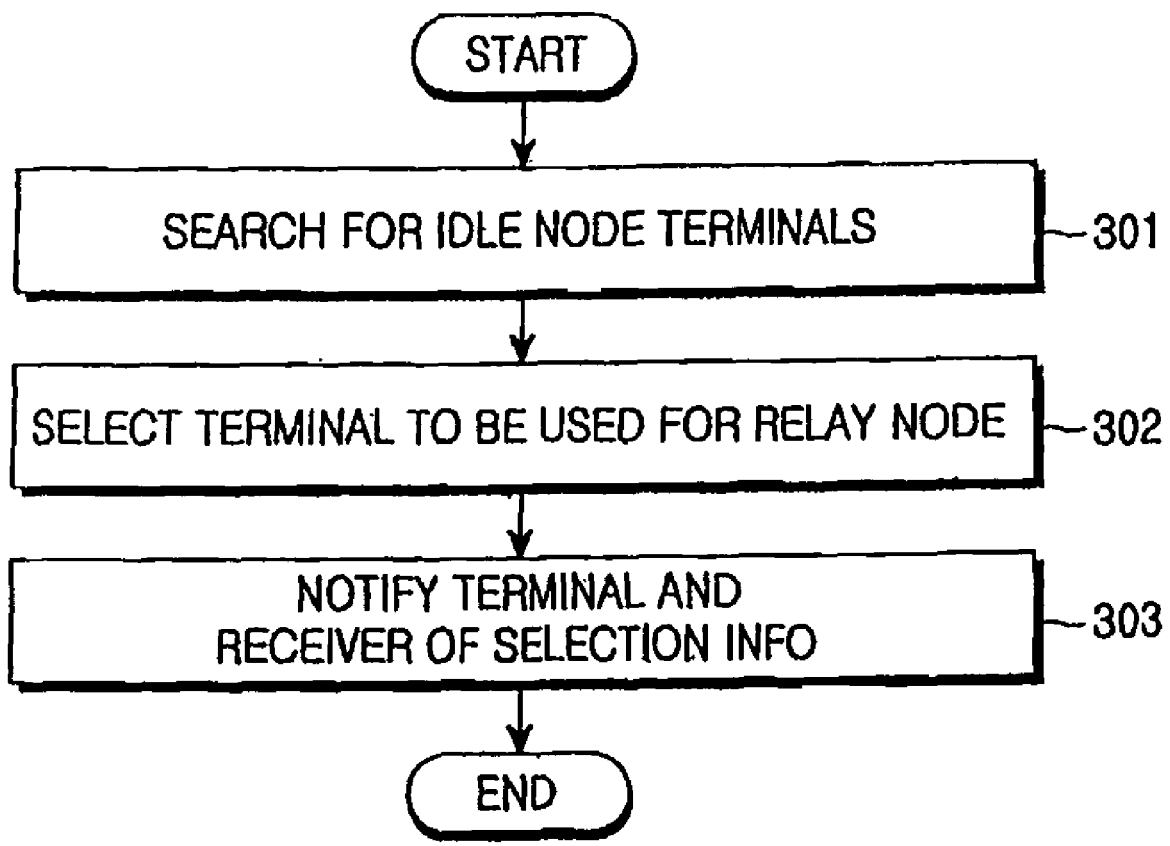
FIG. 3 is a flowchart illustrating a procedure of a relay network in accordance with an exemplary embodiment of the present invention.

FIG. 3 is a flowchart illustrating a method for setting a node in the transmitter in accordance with an exemplary embodiment of the present invention.

As illustrated in FIG. 3, the transmitter 200 in accordance with exemplary embodiments of the present invention searches for idle node terminals located in an associated cell in step 301. Then, a terminal for relaying a transmitted signal is selected from the searched terminals in step 302. At this time, the terminal is selected on the basis of channel environment and distance between the receiver and the terminal, or between the transmitter and the terminal. The number of terminals to be selected is set on the basis of the number of transmitter antennas of the transmitter and the number of receiver antennas of the receiver. Terminals corresponding to a value obtained by subtracting the number of receiver antennas of the receiver, from the minimum number of antennas of the transmitter are selected. A terminal selected as a node and the receiver are notified of node selection information in step 303. According to the above-described procedure, the transmitter, node, and receiver configure a relay network.

When information is transmitted from one point to another, the relay transmission scheme applied to the BS 200 and the MS 250 as described above has many merits. For example, a range of service being provided from the mobile communication system is significantly extended and internal diversity gain of a relay channel is increased in terms of a physical layer, because the relay transmission scheme can easily make a connection between nodes. When a non-linear relation between a path loss and distance is considered, the relay transmission scheme can divide a long path into short paths. As a result, a total path loss can be reduced and a dead spot can be avoided when a high-speed data service is provided in a long distance.

Relay Transmission Scheme

When the relay transmission scheme is applied, the following must be considered. When the number of nodes is large, the channel capacity of the relay transmission scheme is designed to be less than that of the direct transmission scheme. However, to increase a total data rate in terms of a system level, data is transmitted using an increased number of nodes. Moreover, a sufficient signal to interference and noise ratio (SINR) corresponding to the increased number of nodes must be ensured.

Figure 4:
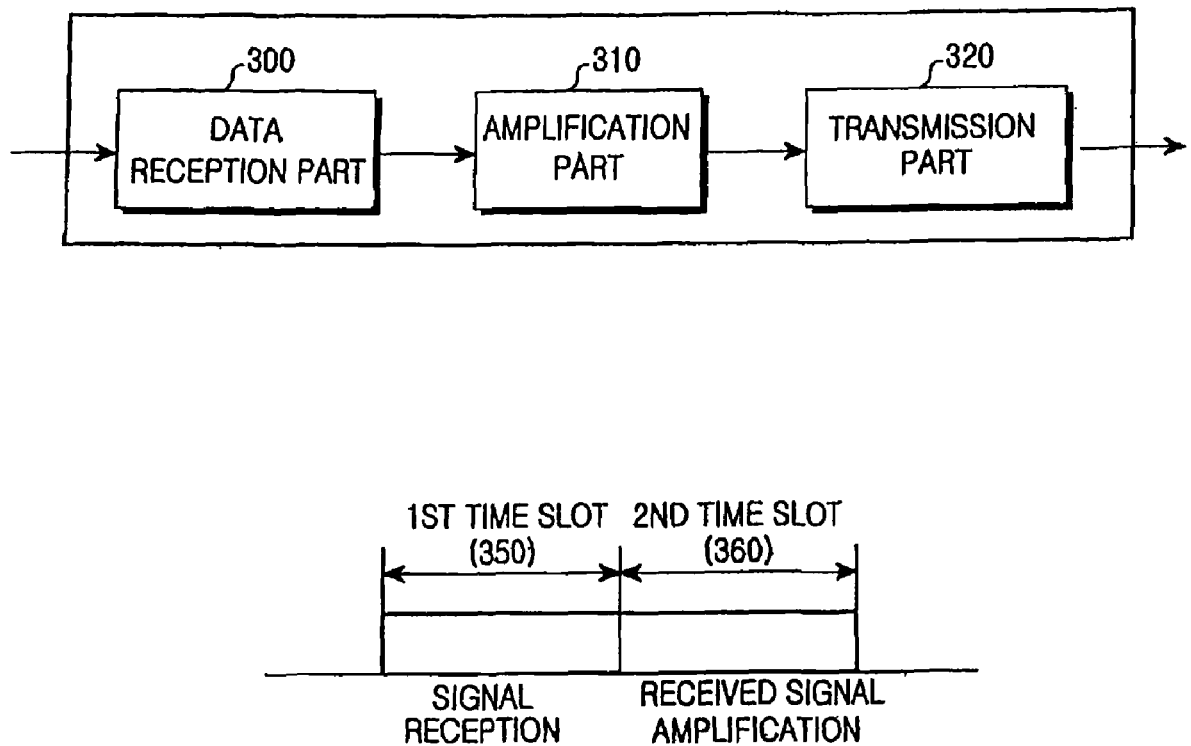
FIG. 4 illustrates exemplary embodiments of a hardware structure and operation of the relay network to which the present invention is applied.

FIG. 4 schematically illustrates a structure of the node in accordance with an exemplary embodiment of the present invention.

Referring to FIG. 4, the node is provided with a data reception part 300, an amplification part 310, and a transmission part 320. The data reception part 300 receives data transmitted from the transmitter. The amplification part 310 amplifies a received signal to allow the receiver to ensure the transmitted data. The transmission part 320 transmits the amplified signal to the receiver 250.

The transmission part 320 is provided with one transmitter antenna. The transmitter antenna is an omni-directional antenna. For example, the node is provided with the amplification part 310 for performing amplification and forwarding operations. The amplification and forwarding operations can be performed at low consumption power. The node can operate in direct mode of a wireless LAN or high-performance LAN type 2 (HiperLAN2).

The node receives data in a first time slot 350, and amplifies and retransmits a received analog signal in a second time slot 360.

Here, nodes can be classified into one or more idle nodes for supporting communication for retransmission of a received signal in MSs of an active state and a relay station for relaying a transmitted signal. To retransmit the received signal, an MS can perform a node function and can set a special relay station.

As a node is set, the receiver combines data of the first and second time slots 350 and 360 retransmitted from the node. The transmitter determines if space-time coding is required between antennas. The space-time coding is applied to the antennas according to a result of the determination. When determining that the relay transmission scheme is required, the transmitter searches for a suitable node group, such as an MS group/wireless LAN/HiperLAN2. When the node group is set, the transmitter searches for a simple node to use for the relay transmission scheme. When the simple node has been searched for, a path loss associated with the simple node is measured, an optimal path associated with the node in which the path loss is minimized is searched for, and data is transmitted through the optimal path. The relay transmission scheme must set in advance a method for transmission and reception in a simple node, a method for synchronization between nodes, a method for searching for an optimal path, and a method for selecting a node for reducing transmission power.

In accordance with exemplary embodiments of the present invention, the relay transmission scheme ensures uniform data communication that is reliable regardless of the number of transmitter/receiver antennas. Moreover, the relay transmission scheme can minimize the path loss even when an MS is far away from a BS or located in a dead spot. Moreover, the relay transmission scheme controls a transmission system and configures a relay network such that the performance of the reception system can be optimized. Consequently, the relay transmission scheme can reduce transmission power, mitigate interference in a total system, and reduce data error when a high-speed data service is provided.

Figure 5:
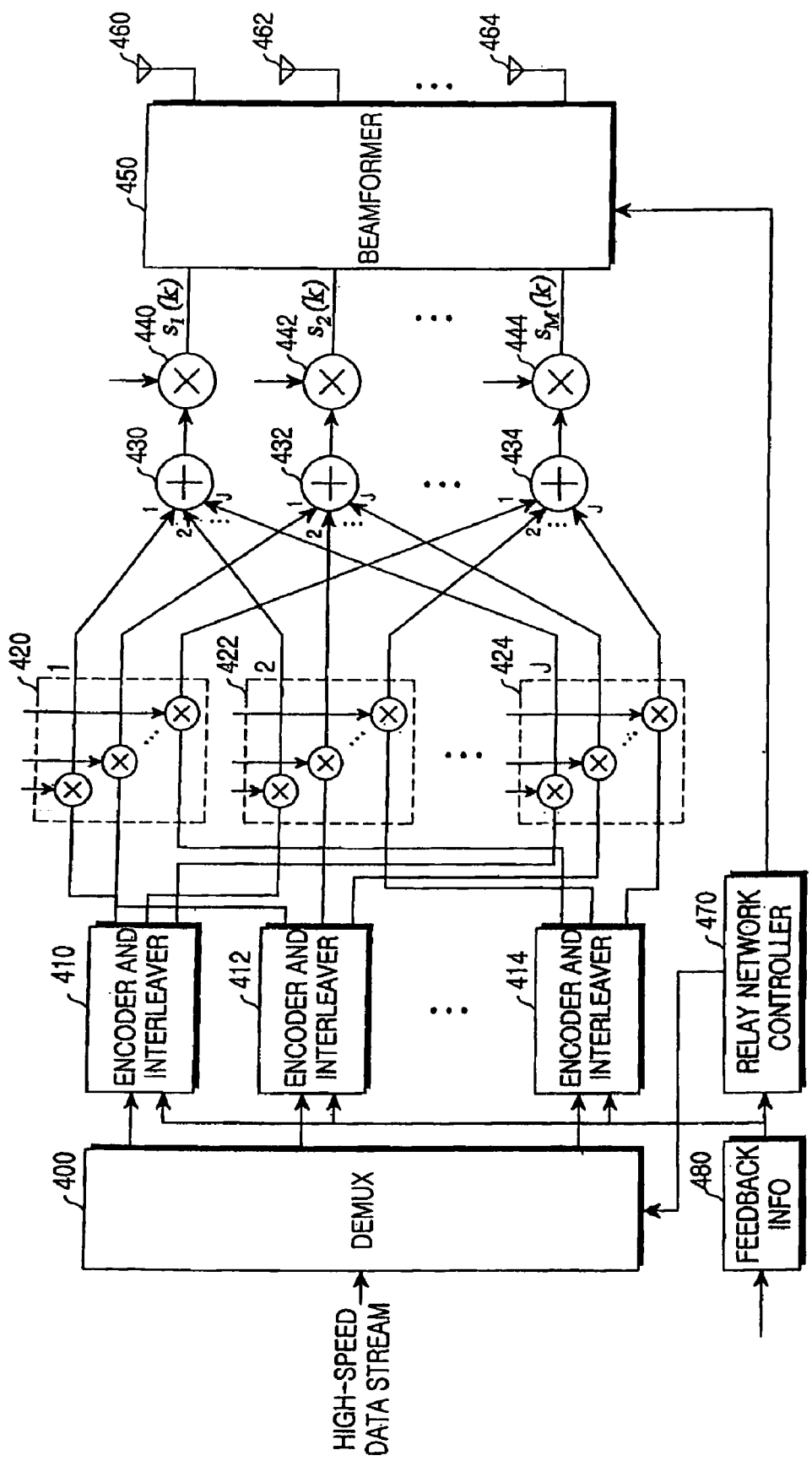
FIG. 5 is a block diagram illustrating a structure of a transmitter to which a relay transmission scheme is applied using the relay network in accordance with the present invention.

FIG. 5 is a block diagram illustrating a structure of a transmitter to which a relay transmission scheme is applied using the relay network in accordance with an exemplary embodiment of the present invention.

As illustrated in FIG. 5, the transmitter in accordance with exemplary embodiments of the present invention includes a demultiplexer (DEMUX) 400, encoders and interleavers 410, 412, . . . , 414, spreaders 420, 422, . . . , 424, adders 430, 432, . . . , 434, multipliers 440, 442, . . . , 444, a beamformer 450, transmitter antennas 460, 462, . . . , 464, and a relay network controller 470.

The DEMUX 400 demultiplexes a high-speed data stream to be transmitted according to a data transmission rate. The encoders and interleavers 410, 412, . . . , 414 receive the demultiplexed data stream and encode and interleave data according to the data transmission rate. Symbols outputted from the encoders and interleavers 410, 412, . . . , 414 are sequentially inputted to the spreaders 420, 422, . . . , 424 and are spread with designated spreading codes. The spread signals are inputted to the adders 430, 432, . . . , 434 and are sequentially added to signals outputted from the other spreaders 420, 422, . . . , 424. The multipliers 440, 442, . . . , 444 multiply the added signals by scrambling codes such the signals can be distinguished between the transmitter antennas. The beamformer 450 forms beams based on set weight values for the multiplied data and transmits the beams through the transmitter antennas 460, 462, . . . , 464.

The relay network controller 470 controls a signal to be transmitted through feedback information 480 such that quality of service (QoS) requested by a receiver, that is, an MS, can be satisfied. A transmission rate of the transmitter antenna depends on the feedback information 480 received from the receiver.

For example, when the MS requests a high-speed data service and the transmitter must transmit independent data through each transmitter antenna, a channel matrix coefficient is less than the number of transmitter antennas if the number of receiver antennas is less than the number of transmitter antennas. Accordingly, the performance of the reception system may be severely degraded and data may not be correctly detected.

The transmitter sends, to the relay network controller 470, the received feedback information 480, that is, information about the number of receiver antennas of the MS, a requested data rate, a correlation between transmit and receiver antennas, or a relay station, such that the relay transmission scheme can be provided.

In other words, the relay network controller 470 transmits data in the direct transmission scheme using the feedback information 480 or transmits data in the relay transmission scheme in which a matrix coefficient of the MS is set to be the same as the number of transmitter antennas. In this instance, the feedback information 480 preferably contain information about a geographical distance between the transmitter and receiver antennas.

A high-speed data stream to be transmitted from the transmitter is spread by J spreading codes. For example, the relay network controller 470 controls the beamformer 450 through the feedback information 480 and computes a weight value for the transmitter antennas such that an antenna beam is focused on the target station corresponding to the receiver. The computed weight value is reflected in the transmitter antennas and the scrambled data is transmitted. Signals to be transmitted from the transmitter antennas are preferably obtained by adding J data elements corresponding to the number of total spreading codes, spread with different spreading codes through the despreaders 420, 422, . . . , 424. When the number of transmitter antennas is M, M×J data elements are transmitted to the receiver through the transmitter antennas during one symbol period.

The transmitter determines if space-time block coding is required in relation to the transmitter antennas by considering information about the reception performance of the receiver antennas, the number of receiver antennas, and a relay station contained in the feedback information 480. That is, the space-time block coding can be applied in the encoders and interleavers 410, 412, . . . , 414 according to the feedback information 480.

Figure 6:
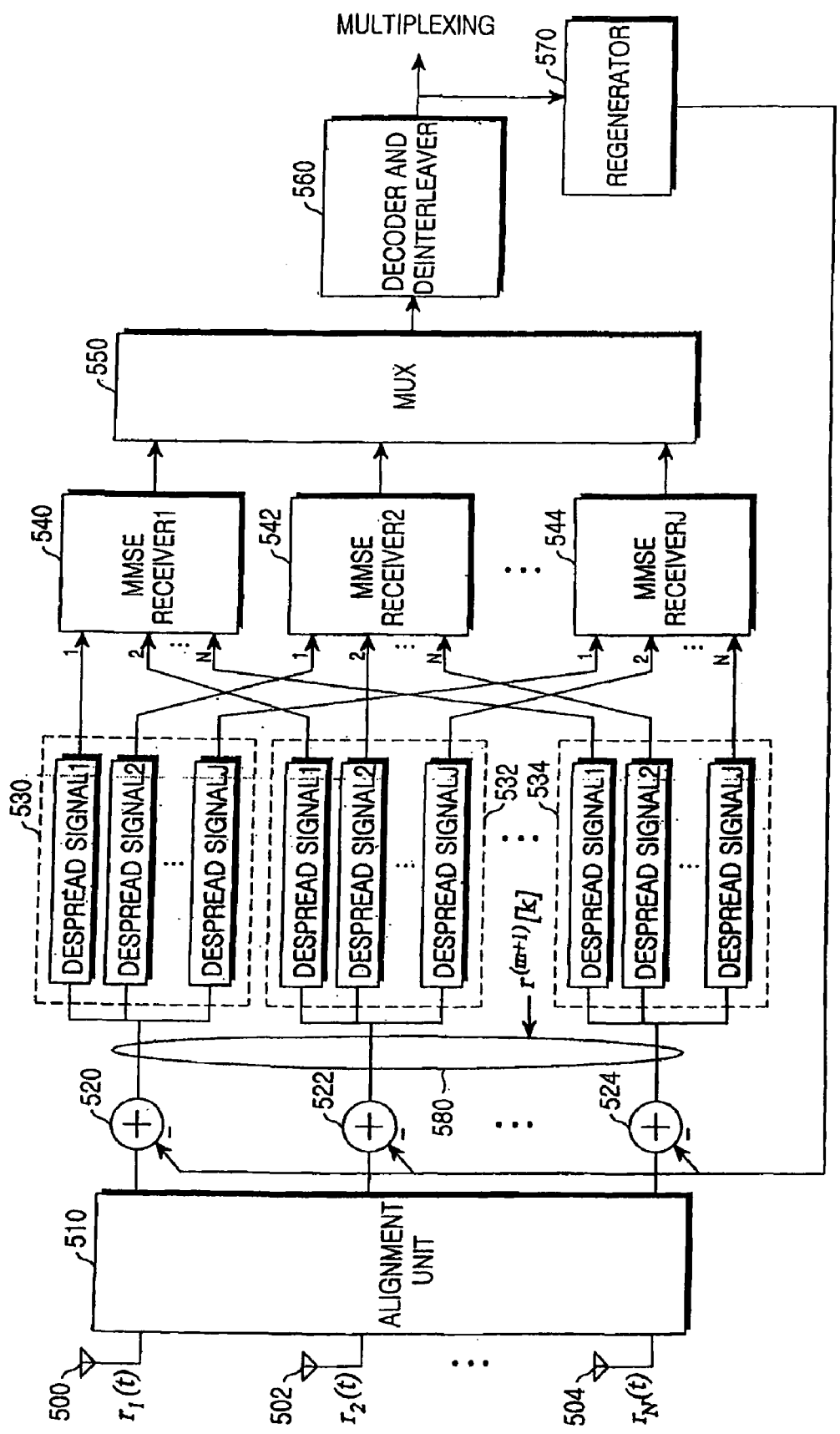
FIG. 6 is a block diagram illustrating a structure of a receiver for removing interference signal components when the relay network is supported in accordance with an exemplary embodiment of the present invention.

FIG. 6 is a block diagram illustrating a structure of a receiver for removing interference signal components when the relay network is supported in accordance with an exemplary embodiment of the present invention. FIG. 6 illustrates the receiver for removing interference signal components using a successive interference cancellation scheme between antennas combined with an MMSE receiver when the relay transmission scheme is used in exemplary embodiments of the present invention.

In the exemplary embodiments of the present invention, a signal transmitted from an antenna with the highest SINR starts to be detected and a transmitted signal is regenerated from the detected signal. Noise cancellation is performed by removing the regenerated signal from the total received signal. When the regenerated signal is removed step by step, the SINR of the received signal is increased and system performance is improved.

The structure and operation of the receiver in accordance with exemplary embodiments of the present invention will be described with reference to FIG. 6.

As illustrated in FIG. 6, the receiver in accordance with an exemplary embodiment of the present invention includes N receiver antennas 500, 502, and 504, an alignment unit 510, adders 520, 522, ..., 524, J despreaders 530, 532, ..., 534, MMSE receivers 540, 542, ..., 544, a multiplexer (MUX) 550, a decoder and deinterleaver 560, and a regenerator 570. N=1 in the case of the conventional MS.

The alignment unit 510 of the receiver aligns signals directly received from the transmitter and relayed signals, and outputs the aligned signals to the adders 520, 522, ..., 524. The adders 520, 522, ..., 524 output the added signals based on the J spreading codes. The despreaders 530, 532, ..., 534 output J despread signals from the added signals on a transmitter antenna-by-transmitter antenna basis. At this time, the MMSE receivers 540, 542, ..., 544 serve as equalizers. Original data signals transmitted from the transmitter antennas and noise are outputted from the despread signals so they can be distinguished from each other. The MUX 550 multiplexes the signals outputted from the MMSE receivers 540, 542, ..., 544 on an antenna-by-antenna basis and outputs the multiplexed signals to the decoder and deinterleaver 560.

The decoder and deinterleaver 560 decode and deinterleave the signals and recover high-speed data originally transmitted. At this time, the decoder and deinterleaver 560 first decode a signal of a transmitter antenna with the highest SINR. The signal of the transmitter antenna with the highest SINR can be distinguished through the MMSE receivers 540, 542, ..., 544.

The regenerator 570 regenerates interference signal components from the decoded signals to remove interference noise between the antennas from all the received signals, and then applies the interference signal components to the adders 520, 522, ..., 524. The adders 520, 522, ..., 524 remove the interference signal components applied by the regenerator 570 from the received signals and detect originally transmitted signals.

When the receiver, in accordance with exemplary embodiments of the present invention detects data transmitted on the transmitter antenna-by-transmitter antenna basis as described above, it removes interference signal components regenerated from all received signals, improves system performance, and reduces a data estimation error probability.

An arithmetic operation for removing interference signal components in the receiver will be described in more detail with reference to FIG. 7.

A transmitter/receiver structure of a MIMO system in accordance with the present invention is based on a Vertical Bell Labs Layered Space-Time (V-BLAST) scheme. The relay transmission scheme operates according to the relay network controller. In this instance, a data stream to be transmitted is demultiplexed and the demultiplexed data is encoded and interleaved according to a data transmission rate. The data streams spread with J spreading codes are scrambled according to scrambling codes for distinguishing between transmitter antennas and are transmitted through M transmitter antennas. The transmitter sets a data transmission rate of the transmitter antenna on the basis of the feedback information and classifies data according to the number of transmitter antennas M. Here, the despreader uses an identical code according to each data transmission rate. When the relay transmission scheme is requested according to a channel state, the relay network controller operates.

For example, a transmission signal vector is denoted by $s(t)=[s_1(t)s_2(t)\ldots s_M(t)]^T$, and a signal to be transmitted from each transmitter antenna is denoted by $s_m(t)$. When a total channel formed between transmitter and receiver antennas in the relay transmission scheme is H, the j-th spreading code $c_j[k]$ (where k=1, 2, ..., SF) of J spreading codes has a length corresponding to a spreading factor (SF). The spreading codes are orthogonal to each other. When transmitted signals pass through the channel H, received signals incoming to N receiver antennas can be expressed as shown in Equation (1).

$$r[k] = \sqrt{\frac{\alpha^2}{M}} H \sum_{j=1}^{J} c_j[k] b_j + n[k] = \sqrt{\frac{\alpha^2}{M}} Hs[k] + n[k] \quad \text{Equation (1)}$$

In Equation (1), $\alpha^2$ is a normalized value of received signal power and n[k] is noise.

The received signal is spread with the j-th spreading code, and the spread signal can be expressed as shown in Equation (2).

$$z_j = \sum_{k=1}^{N_{SF}} c_j^*[k] r[k] = \sum_{k=1}^{N_{SF}} c_j^*[k] \left( \sqrt{\frac{\alpha^2}{M}} H \sum_{i=1}^{J} c_i[k] b_i + n[k] \right) \quad \text{Equation (2)}$$

$$= \sqrt{\frac{\alpha^2}{M}} H b_j + n_j$$

The despreaders 530, 532, ..., 534 perform a despreading operation for a spreading code j=1, 2, ..., J.

The MMSE receivers 540, 542, ..., 544 perform MMSE operations on the despread signals through a linear switching matrix W as shown in Equation (3) to compute resulting MMSE values.

$$W = [w_1 w_2 \cdots w_M] = \sqrt{\frac{M}{\alpha^2}} H \left( H^*H + \frac{M}{\alpha^2} I_M \right)^{-1} \quad \text{Equation (3)}$$

Accordingly, MMSE values for J data elements of the m-th transmitter antenna are $w_m^* z_1, w_m^* z_1, \ldots, w_m^* z_J$. A soft estimate of a symbol of a total transmitter antenna obtained from the MMSE values can be expressed as shown in Equation (4).

$$\tilde{B} = [\tilde{b}_1 \tilde{b}_2 \ldots \tilde{b}_J], \tilde{b}_j = W^* z_j \quad \text{Equation (4)}$$

Here, $\tilde{b}_j$ is a hard-decision value. The regenerator 570 regenerates signals using $\tilde{b}_j = \text{sgn}(W^* z_j)$ on a transmitter antenna-by-transmitter antenna basis. The adders 520, 522, ..., 524 remove interference signal components from the received signals. The above-described process is repeated for Indices 1 to M corresponding to the number of transmitter antennas.

Figures 7, 8:
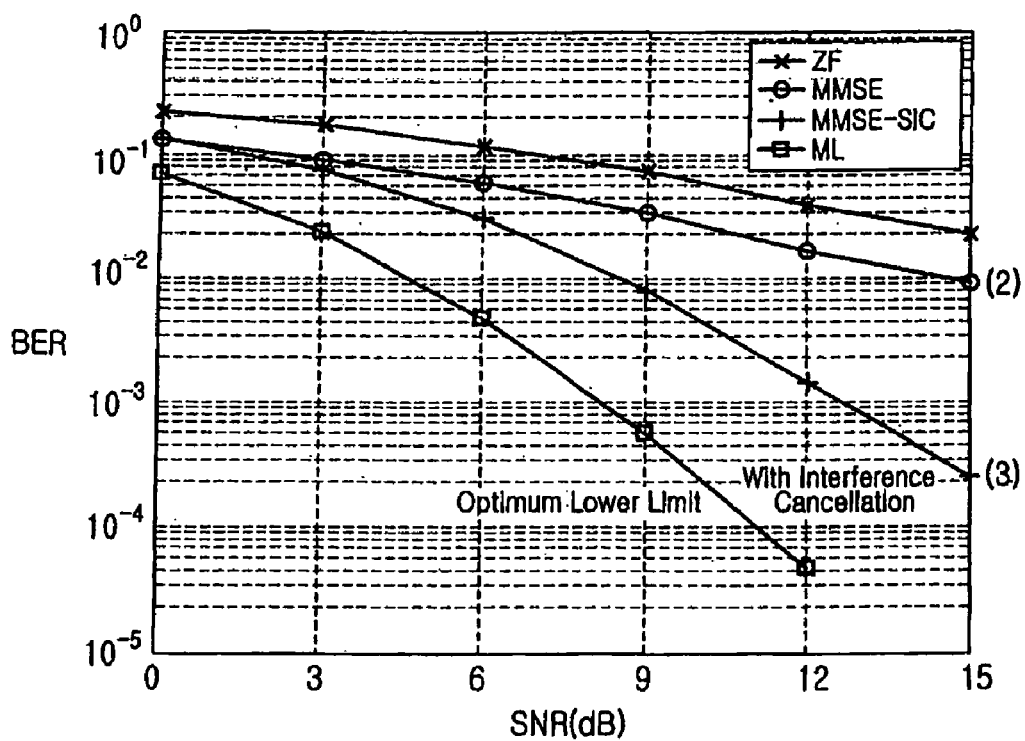
FIG. 7 is a block diagram illustrating an arithmetic operation for removing interference signal components in the receiver of FIG. 6.
FIG. 8 is a graph illustrating the performance of a system for interference cancellation in accordance with an exemplary embodiment of the present invention.

FIG. 8 is a graph illustrating the performance of a system for interference cancellation in accordance with an exemplary embodiment of the present invention.

The present invention uses the following conditions.

When the system operates in an identical link level simulation, system performances are compared using a bit error rate (BER). It is assumed that a channel is configured by independent complex Gaussian random parameters, the number of transmitter antennas M=4, and the number of receiver antennas N=1. Moreover, it is assumed that SF=16 and the number of spreading codes J=8. The received signals are directly transmitted signals and signals relayed through three relay stations based on the relay transmission scheme.

FIG. 8 illustrates a performance comparison between a zero-forcing (ZF) receiver, an MMSE receiver, a minimum mean square error-successive interference cancellation (MMSE-SIC) receiver, and an ideal maximum likelihood (ML) using a QPSK modulation scheme. If the BER is 0.01, a significant performance difference is present between the MMSE receiver with an interference canceller as indicated by (3) and the MMSE receiver without an interference canceller as indicated by (2).

When interference cancellation is performed, the effect of system performance improvement of about 6 dB is obtained, but does not correspond to the ideal ML performance. It can be found that a significant performance difference is present between a case where interference noise between the antennas is removed and a case where interference noise between the antennas is not removed.

As is apparent from the above description, exemplary embodiments of the present invention has the following advantages.

The present invention can increase a channel matrix coefficient using a relay transmission scheme to ensure a high-speed data service in the mobile communication system with multiple transmitter/receiver antennas and can ensure data processing capacity. To ensure independent channel characteristics between multiple transmitter antennas, a receiver can prevent system performance from being degraded by sequentially and repeatedly removing interference signal components from the received signals in descending order of signal-to-noise ratios (SNRs).

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A system for transmitting and receiving high-speed data, comprising:
a transmitter for transmitting high-speed data through a plurality of transmitter antennas in one of a direction transmission scheme or a relay transmission scheme at a data transmission rate;
a relay node for retransmitting the signals transmitted from the plurality of transmitter antennas in the relay transmission scheme, wherein the relay node retransmits the signal in a different timeslot though at least one antenna; and
a receiver for dividing signals received from the antennas into data signals and noise to recover data, regenerating the transmitted signals from the recovered data, identifying the data signals and interference signal components, and removing the interference signal components from the signals transmitted on a transmitter antenna-by-transmitter antenna basis,
wherein the data transmission rate is set by feedback information transmitted from the receiver or the relay node.

2. A system for transmitting and receiving high-speed data, comprising:
a receiver for dividing signals transmitted from a plurality of transmitter antennas into data signals and noise to recover data, regenerating the transmitted signals from the recovered data, identifying the data signals and interference signal components, and removing the interference signal components from the signals transmitted on a transmitter antenna-by-transmitter antenna basis;
a relay node for retransmitting the signals transmitted from the plurality of transmitter antennas to antennas of the receiver; and
a transmitter for transmitting the high-speed data through the plurality of transmitter antennas in one of a direction transmission scheme or a relay transmission scheme at a data transmission rate set by feedback information transmitted from the receiver or the relay node,
wherein the receiver comprises:
a plurality of equalizers for dividing the signals transmitted from the plurality of transmitter antennas into the data signals and the noise;
a decoder and deinterleaver for decoding and deinterleaving the signals output from the plurality of equalizers and recovering the data;
a regenerator for regenerating the transmitted signals from the recovered data and identifying the data signals and the interference signal components; and
a plurality of adders for removing the interference signal components from the signals transmitted on the transmitter antenna-by-transmitter antenna basis.

3. A system for transmitting and receiving high-speed data, comprising:
a receiver for dividing signals transmitted from a plurality of transmitter antennas into data signals and noise to recover data, regenerating the transmitted signals from the recovered data, identifying the data signals and interference signal components, and removing the interference signal components from the signals transmitted on a transmitter antenna-by-transmitter antenna basis;
a relay node for retransmitting the signals transmitted from the plurality of transmitter antennas to antennas of the receiver; and
a transmitter for transmitting the high-speed data through the plurality of transmitter antennas in one of a direction transmission scheme or a relay transmission scheme at a data transmission rate set by feedback information transmitted from the receiver or the relay node,
wherein the transmitter comprises:
a relay network controller for performing a control operation such that the high-speed data is transmitted in one of the direction transmission scheme or the relay transmission scheme using the feedback information transmitted from the receiver and the relay node;
a demultiplexer for demultiplexing a stream of the high-speed data to be transmitted according to a data transmission rate set by the feedback information;
a data converter for encoding, interleaving, and spreading the demultiplexed data stream; and
a beamformer for forming beams based on preset weight values for spread signals according to a control operation of the relay network controller and transmitting the beams through the plurality of transmitter antennas.

4. A method for transmitting and receiving high-speed data between a receiver and a transmitter through a relay node, comprising the steps of:
searching for receivers corresponding to idle state nodes among receivers located in a cell, selecting a receiver to be used for a relay node from the searched receivers, and notifying a target receiver and the receiver to use for the relay node of a selection result in the transmitter;

setting a transmission rate of the high-speed data to be transmitted using feedback information from the receiver and demultiplexing a stream of the high-speed data according to the data transmission rate in the transmitter;

encoding, interleaving, and spreading the demultiplexed data stream, and forming beams based on weight values for spread signals according to a control operation of a relay network controller in the transmitter;

selecting one of a direct transmission scheme or a relay transmission scheme on a basis of the feedback information in the transmitter and transmitting the high-speed data in the selected transmission scheme;

despreading received signals on a transmitter antenna-by-transmitter antenna basis according to a preset spreading factor, dividing the despread signals into data signals and noise, regenerating the signals transmitted through transmitter antennas, and identifying data components and interference signal components in the receiver; and removing the interference signal components from the signals transmitted on the transmitter antenna-by-transmitter antenna basis in the receiver.

5. The method of claim 4, wherein the step of transmitting the high-speed data comprises the steps of:

setting the selected receiver as the relay node; and transmitting the high-speed data to the target receiver in the relay transmission scheme.

\* \* \* \* \*